US008967037B2

(12) United States Patent
Jones et al.

(10) Patent No.: US 8,967,037 B2
(45) Date of Patent: Mar. 3, 2015

(54) THRUST LUBRICATION STRATEGY FOR ROLLER LIFTERS OF A COMMON RAIL FUEL PUMP

(75) Inventors: Christopher Robert Jones, Washington, IL (US); Stephen Robert Lewis, Chillicothe, IL (US); Sana Mahmood, Peoria, IL (US); Eric L. Rogers, El Paso, IL (US)

(73) Assignee: Caterpillar Inc., Peoria, IL (US)

( * ) Notice: Subject to any disclaimer, the term of this patent is extended or adjusted under 35 U.S.C. 154(b) by 671 days.

(21) Appl. No.: 13/306,140

(22) Filed: Nov. 29, 2011

(65) Prior Publication Data

US 2013/0133621 A1 May 30, 2013

(51) Int. Cl.
*F16J 1/10* (2006.01)
*F01B 31/10* (2006.01)

(52) U.S. Cl.
USPC ................................................ 92/129; 92/153

(58) Field of Classification Search
USPC ................ 92/129, 153, 72; 123/90.48, 90.44; 74/569, 567
See application file for complete search history.

(56) References Cited

U.S. PATENT DOCUMENTS 3,596,533 A 8/1971 Nightingale
5,676,098 A 10/1997 Cecur
5,797,364 A 8/1998 Meek et al.
6,216,583 B1 * 4/2001 Klinger et al. .................. 92/129
7,568,461 B1 8/2009 Straub
7,748,359 B2 7/2010 Bartley et al.
7,878,169 B2 2/2011 Brinks
7,980,216 B2 7/2011 Elnick et al.
2008/0006233 A1 1/2008 Bartley et al.
2011/0052427 A1 3/2011 Shaull et al.

FOREIGN PATENT DOCUMENTS

JP 05332222 12/1993
JP 11200989 7/1999
JP 2001317430 11/2001
JP 2009108702 5/2009
JP 2010164154 7/2010

* cited by examiner

*Primary Examiner* — Edward Look
*Assistant Examiner* — Daniel Collins
(74) *Attorney, Agent, or Firm* — BakerHostetler

(57) ABSTRACT

A common rail fuel pump includes a cam shaft with at least one cam rotatably supported in a pump housing. A plurality of tappet assemblies are each reciprocatingly movable in the pump housing, and include an axle pin mounted in a tappet, and a roller mounted in contact for rotation about the axle pin. Each end of the roller includes a plurality of non-contiguous planar thrust surfaces separated by lubrication grooves. A lubrication pathway for the roller includes in sequence a lubrication passage that opens to a roller bearing surface, movement along the roller bearing surface into the lubrication grooves, and then between the planar thrust surface of the roller and a counterpart thrust face of the tappet responsive to rotation of the roller on the cam shaft.

15 Claims, 3 Drawing Sheets

THRUST LUBRICATION STRATEGY FOR ROLLER LIFTERS OF A COMMON RAIL FUEL PUMP

TECHNICAL FIELD

The present disclosure relates generally to common rail fuel pumps that supply pressurized fuel to fuel injectors of an internal combustion engine, and more particularly to a thrust lubrication strategy for roller lifters of a common rail fuel pump.

BACKGROUND

Many modern engines, including compression ignition engines, utilize a common rail fuel system for supplying fuel to each individual cylinder of the engine. In a common rail fuel system, a common rail fuel pump takes in low pressure fuel and supplies high pressure fuel to a common rail. Fuel injectors associated with each individual cylinder are fluidly connected to the common rail via individual branch passages. Over the years, the industry has demanded ever higher injection pressures, and hence ever higher common rail fuel pressures. As these rail pressures have exceeded 200 MPa and quickly approach 300 MPa, new problems have emerged in common rail fuel systems.

Common rail fuel pumps typically include two or more pump assemblies in a pump housing that are driven by a rotating cam shaft that includes one or more cams, each having one or more lobes. The different pump assemblies are typically out of phase so that the common rail can receive intermittent doses of high pressure fuel throughout the engine cycle to compensate for intermittent fuel injection from individual fuel injectors around the same engine cycle. In one particular example, a common rail fuel pump might include a cam shaft mounted for rotation in a pump housing. Rotational motion of the cam is translated into reciprocating motion of pump pistons by way of two or more individual tappet assemblies. Each tappet assembly includes a tappet that carries an axle about which a roller is rotationally mounted. The roller maintains contact with the rotating cam, and causes a reciprocating motion with each passage of a cam lobe. In order to function properly over an extensive working life, the good lubrication must be maintained for the roller, or premature wear and potential failure of the pump can occur.

The present disclosure is directed toward one or more problems set forth above.

SUMMARY

In one aspect, a common rail fuel pump includes a cam shaft with at least one cam rotatably supported in a pump housing. A plurality of tappet assemblies are each reciprocatingly movable in the pump housing, and include an axle pin mounted in a tappet, and a roller mounted in contact for rotation about the axle pin. The roller includes a bearing surface and a cam contact surface extending between a first thrust surface and a second thrust surface. The roller is trapped to move along an axis of the axle pin in a tappet pocket of the tappet between a first thrust contact position and a second thrust contact position. The first thrust surface of the roller being in contact with a first thrust face of the tappet at the first thrust contact position, and the second thrust surface of the roller being in contact with a second thrust face of the tappet at the second thrust contact position. The axle pin defines a lubrication passage that opens through a roller bearing surface of the axle pin to the bearing surface of the roller.

The first thrust surface include a plurality of the non-contiguous first planar surfaces separated by first lubrication grooves. The second thrust surface includes a plurality of non-contiguous second planar surfaces separated by second lubrication grooves.

In another aspect, a tappet assembly includes a tappet with a first thrust face and a second thrust face that partially define a tappet pocket. The tappet defines a lubrication supply passage. An axle pin in affixed to the tappet and includes an annular roller bearing surface extending between the first thrust face and the second thrust face, and defines a roller lubrication passage that connects on one end to the lubrication supply passage and opens at an opposite end through the roller bearing surface. A roller includes a roll bearing surface and a cam contact surface extending between a first thrust surface and a second thrust surface, and is mounted in contact for rotation about the axle pin. The first thrust surface includes a plurality of non-contiguous first planar surfaces separated by first lubrication grooves, and the second thrust surface includes a plurality of non-contiguous second planar surfaces separated by second lubrication grooves. A portion of lubrication fluid moves from the lubrication supply passage, along the roller bearing surface, into the first and second lubrication grooves, and then between the first thrust face and the first thrust surface, and between the second thrust face and the second thrust surface when the roller is rotating.

In still another aspect, a method of operating a common rail fuel pump includes reciprocating a plurality of tappet assemblies in a pump housing by rotating a cam shaft. The reciprocating step includes rotating a roller on an axle pin of each of the tappet assemblies, and contacting the roller with a cam of the cam shaft. A roll interaction between the roller and the axle pin is lubricated from a lubrication passage that open through a roller bearing surface of the axle pin. A thrust interaction between the roller and thrust faces of the tappet of the tappet assembly is lubricated by moving lubrication fluid from lubrication grooves separating planar thrust surfaces of the roller to between the thrust surfaces and thrust faces of the tappet.

DETAILED DESCRIPTION

Figure 1:
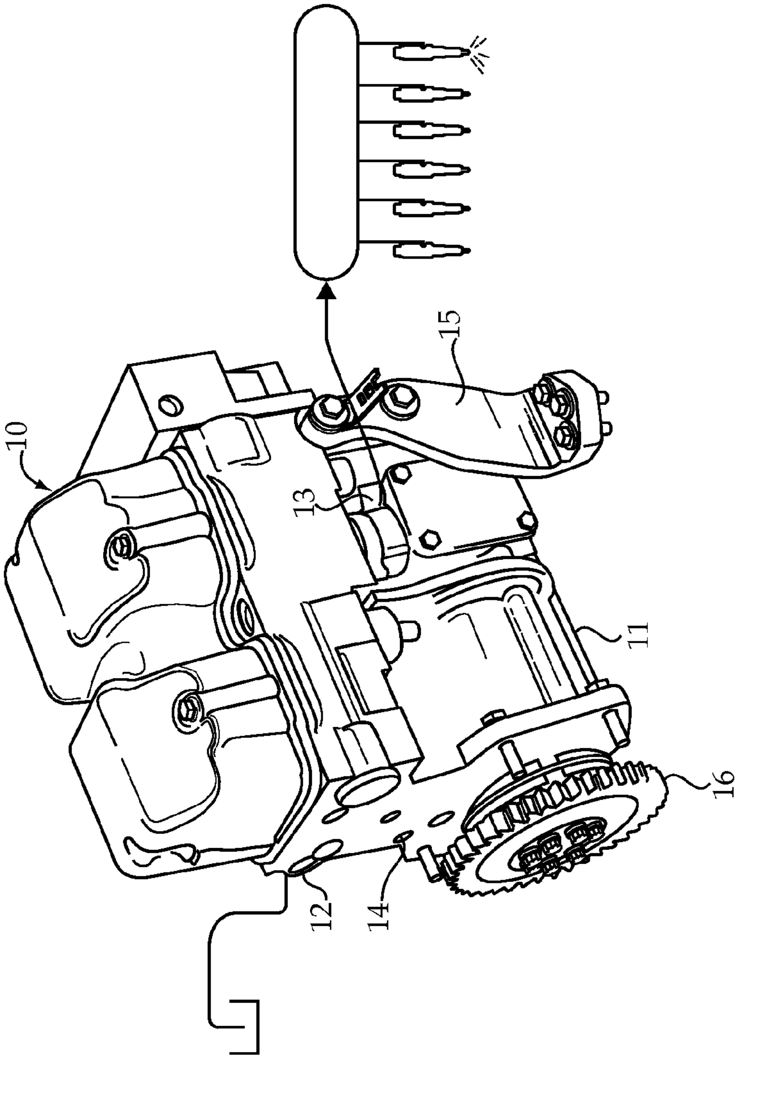
FIG. 1 is an isometric view of a common rail fuel pump according to the present disclosure.

Referring initially to FIG. 1, a common rail fuel pump 10 is shown schematically in a common rail fuel system such that fuel arrives at low pressure inlet 12, fuel pressure is raised in pump housing 11 and exits at fuel outlet 13. Thereafter, a common rail supplies individual fuel injectors, which may be located for direct injection in the case of a compression ignition engine. Common rail fuel pump 10 may be directly driven by an engine via a gear train that includes gear 16. Common rail fuel pump 10 may be internally lubricated with lubrication oil that arrives at inlet 14, lubricates the interior moving parts, and exits pump housing 11 at lubrication oil outlet 15 for recirculation.

Figure 2:
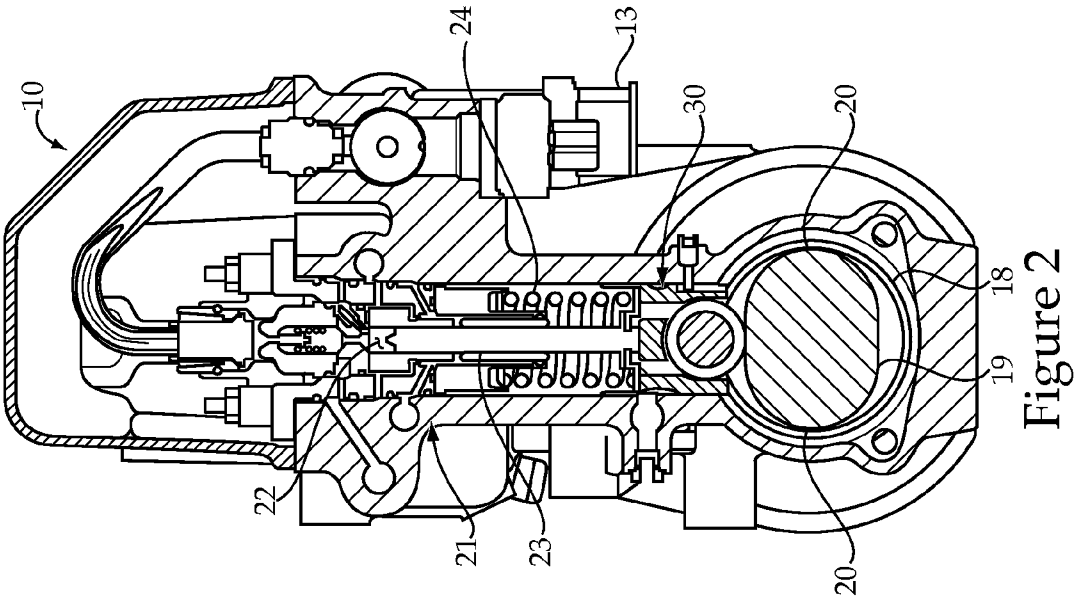
FIG. 2 is a sectioned side view of the one pumping element of the common rail fuel pump of FIG. 1.
Figure 3:
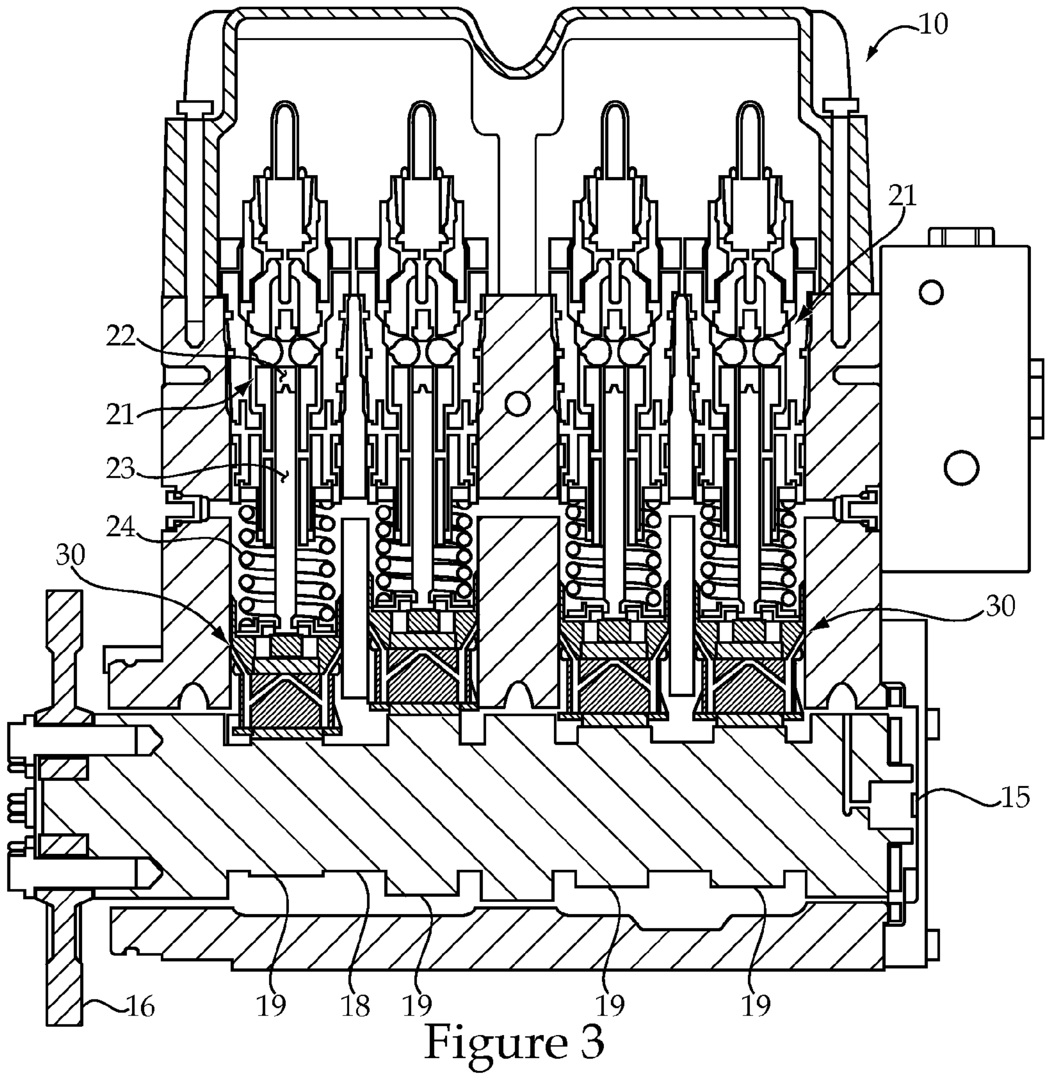
FIG. 3 is a front sectioned view through the common rail fuel pump of FIG. 1.

Referring in addition to FIGS. 2 and 3, common rail fuel pump 10 includes a cam shaft 18 that is rotatably supported in pump housing 11, and driven to rotate by gear 16. Pump shaft 18 is shown as including four cams 19 that each include two lobes 20. Thus, in the illustrated example, common rail fuel pump 10 includes four pumping assemblies 21 that are each associated with an individual tappet assembly 30. Tappet assembly 30 converts the rotational motion of cam lobes 20 into reciprocating motion that is transferred to pump pistons 23 that reciprocate to pressurized fuel in a pump chamber 22. The coupling between pump assemblies 21 and cam shaft 18 is maintained by the pre-load of a biasing spring 24 in a known manner.

Figure 4:
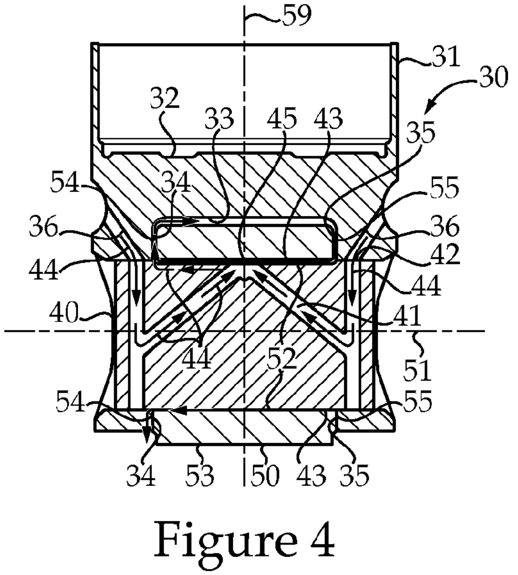
FIG. 4 is an enlarged sectioned front view of one of the tappet assemblies shown in FIG. 3.
Figure 5:
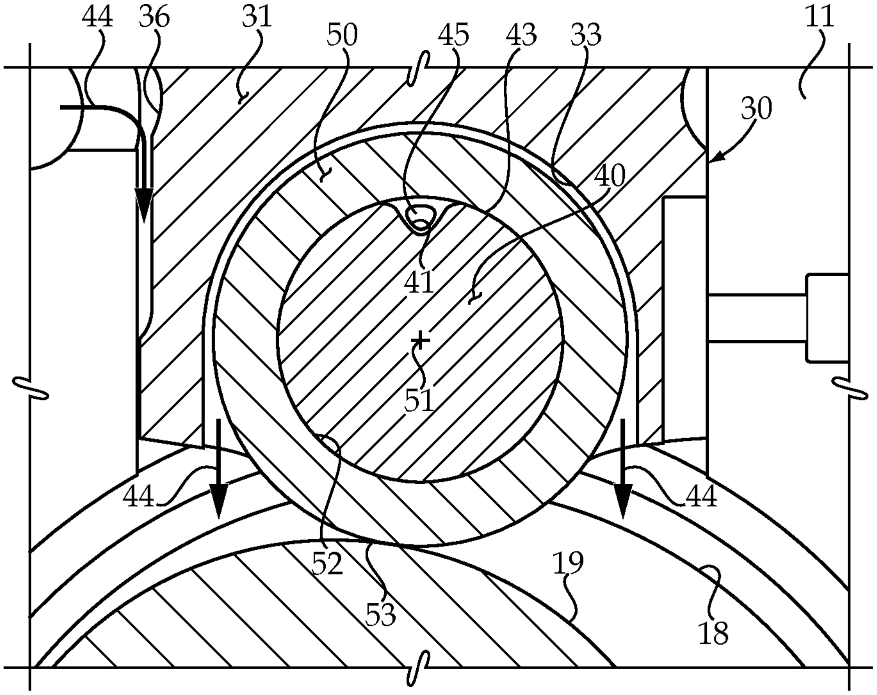
FIG. 5 is an enlarged sectioned side view of the tappet assembly shown in FIG. 2.
Figure 6:
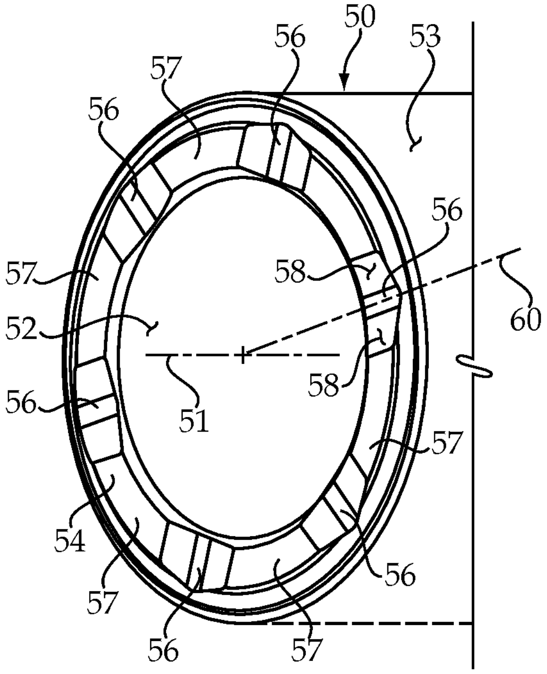
FIG. 6 is a perspective end view of a roller according to the present disclosure.

Referring now in addition to FIGS. 4 and 5, each tappet assembly 30 includes an axle pin 40 affixed to and mounted in a tappet pocket 33 defined by a tappet 31. A roller 50 is mounted in contact for rotation about axle pin 40. The pump piston 23 may contact a top surface 32 of tappet assembly 30, while a cam contact surface 53 rolls on cam 19 under the action of spring 24. The roller 40 includes a bearing surface 52 that bears against roller bearing surface 43 of axle pin 40. Roller 50 rotates about axis 51 responsive to rotation of cam shaft 18. Bearing surface 52 and cam surface 53 extend between a first thrust surface 54 and a second thrust surface 55. The roller 50 is trapped to move along axis 51 in tappet pocket 33 of tappet 31 between a first thrust contact position and, in the opposite direction, a second thrust contact position. The first thrust surface 54 of roller 50 is in contact with a first thrust face 34 of tappet 31 at the first thrust contact position. When the roller 50 moves in an opposite direction, the second thrust surface 55 is in contact with a second thrust face 35 of tappet 31 at the second thrust contact position.

Lubrication of the roller interaction between roller 50 and axle pin 40, as well as the thrust interaction of roller 50 with tappet 31 is facilitated by a lubrication pathway 44 that extends between lubrication oil inlet 14 and lubrication oil outlet 15, with the segment associated with tappet assembly 30 shown in FIG. 4. The lubrication pathway 44 includes in sequence a lubrication supply passage 36 that is defined by tappet 31, and then into a roller lubrication passage 41 defined by axle pin 40. In particular, roller lubrication passage 41 opens at one end 42 to the lubrication supply passage 36, and at its opposite end 45 opens through roller bearing surface 43. Opposite opening end 45 may be located at about the center of axle pin 40 and roller 50. After exiting at opposite end 45, the lubrication fluid moves in opposite directions along roller bearing surface 43 parallel to axle 51 to lubricate the roll interaction between roller 50 and axle pin 40.

After moving along roller bearing surface 43, the lubrication fluid moves into lubrication grooves 56 that separate a plurality of planar surfaces 57, that together make up first and second thrust surfaces 54 and 55 at opposite ends of roller 50. As roller 50 rotates, the lubrication fluid in lubrication grooves 56 may be urged along ramps 58 that terminate at the planar surfaces 57. Although not necessary, the shape of each lubrication groove 56 may be symmetrical on either side of its centerline 60 so that roller 50 may be symmetrical about a plane 59 perpendicular to axis 51. With this symmetry, roller 50 may be mounted in either direction on axle pin 40 at time of assembly so that mis-assembly is not possible. Each of the centerlines 60 of the individual lubrication grooves 56 may coincide with a radius extending from rotation axis 51. In the illustrated embodiment, each roller 50 includes six separate planar surfaces 57 separated by six individual lubrication grooves 56 on each end of the roller. Nevertheless, those skilled in the art will appreciate that any number of planar surfaces and lubrication grooves would also fall within the scope of the present disclosure. Thus, the planar surfaces 57 can be considered as non-contiguous due to their separation by lubrication grooves 56.

INDUSTRIAL APPLICABILITY

The common rail fuel pump 10 of the present disclosure finds potential application in any fuel system for internal combustion engines that utilize a common rail fueling system. Although the common rail fuel pump has been illustrated as including a cam shaft with four cam lobes and associated with four individual pump assemblies 21, those skilled in the art will appreciate that each cam 19 could power two or more pump assemblies and the pump may have only a single cam. The common rail fuel pump of the present disclosure finds specific application in association with compression ignition engines that utilize extremely high injection pressures, such as to facilitate cleaner combustion cycles to produce better emissions. These extremely high pressures have resulted in new lubrication problems emerging. In some circumstances there may be an inability to maneuver sufficient quantities of lubrication fluid between a thrust surface 54, 55 of a roller coming in contact with a counterpart thrust face 34, 35 of a tappet 31.

When in operation, an engine, not shown, drives gear 16 and cam shaft 18 to rotate. The tappet assemblies 30 reciprocate in the pump housing 11 responsive to rotation of cam shaft 18. The roller 50 rotates on axle pin 40 responsive to rotation of the individual cams 19 via the contact interaction therewith. The roller interaction between the roller 50 and the axle pin 40 is lubricated from lubrication oil emerging from a lubrication passage at an opening through roller bearing surface 43 of axle pin 40. The thrust interaction between roller 50 and tappet 31 is lubricated by moving lubrication oil into lubrication grooves 56 that separate the planar thrust surfaces 57 of roller 50. The lubrication oil moves out of the lubrication grooves 56 into the space between thrust surface 54, 55 and thrust faces 34, 35 of tappet 31. Each of the lubrication grooves 56 may include a ramp 58 that terminates at one of the planar surfaces 57 for urging the lubrication fluid along the ramp and into the thrust lubrication area. By orienting the lubrication grooves 56 to coincide with a radius from the rotation axis 51 of roller 50, centrifugal force may tend to help move lubrication fluid into the individual lubrication grooves 56, and the symmetry may allow the rollers 50 to be mounted in either direction with equal performance. Due to geometry of the individual components, potential mounting orientation of common rail fuel pump 10, and other known and unknown factors, the roller 50 can be expected to move along axis 51 between contact with thrust faces 34 and 35 of tappet 31. By ensuring an adequate supply of lubrication fluid between the thrust surfaces 54, 55 of roller 50 with the counterpart thrust faces 34, 35 of tappet 31, premature wear and potential failure of common rail fuel pump 10 can be reduced.

It should be understood that the above description is intended for illustrative purposes only, and is not intended to limit the scope of the present disclosure in any way. Thus, those skilled in the art will appreciate that other aspects of the disclosure can be obtained from a study of the drawings, the disclosure and the appended claims.

What is claimed is:

1. A common rail fuel pump comprising:

a pump housing;

a cam shaft rotatably supported in the pump housing and including a cam;

a plurality of tappet assemblies each reciprocatingly movable in the pump housing, and including an axle pin mounted in a tappet, and a roller mounted in contact for rotation about the axle pin;

the roller including a bearing surface and a cam contact surface extending between a first thrust surface and a second thrust surface, and the roller being trapped to move along an axis of the axle pin in a tappet pocket of the tappet between a first thrust contact position and a second thrust contact position;

the first thrust surface of the roller being in contact with a first thrust face of the tappet at the first thrust contact position, and the second thrust surface of the roller being in contact with a second thrust face of the tappet at the second thrust contact position;

the axle pin defining a lubrication passage that opens through a roller bearing surface of the axle pin to the bearing surface of the roller;

the first thrust surface including a plurality of non-contiguous first planar surfaces separated by first lubrication grooves;

the second thrust surface including a plurality of non-contiguous second planar surfaces separated by second lubrication grooves; and wherein each of the lubrication grooves is partially defined by a ramp that terminates at one of the first thrust surface and the second thrust surface.

2. The common rail fuel pump of claim 1 wherein the tappet assembly defines a lubrication pathway that includes in sequence the lubrication passage, along the roller bearing surface, into the first and second lubrication grooves, and then between the first thrust face and the first thrust surface and between the second thrust face and the second thrust surface when the roller is rotating responsive to rotation of the cam shaft.

3. The common rail fuel pump of claim 1 wherein the roller is symmetrical on each side of a plane perpendicular to the axis of the axle pin.

4. The common rail fuel pump of claim 1 wherein each of the lubrication grooves has a centerline coincident with a radius from the axis of the axle pin.

5. The common rail fuel pump of claim 4 wherein the roller is symmetrical on each side of a plane perpendicular to the axis of the axle pin.

6. The common rail fuel pump of claim 5 wherein the tappet assembly defines a lubrication pathway that includes in sequence the lubrication passage, along the roller bearing surface, into the first and second lubrication grooves, and then between the first thrust face and the first thrust surface and between the second thrust face and the second thrust surface when the roller is rotating responsive to rotation of the cam shaft; and wherein each of the lubrication grooves is partially defined by a ramp that terminates at one of the thrust surfaces.

7. A tappet assembly comprising:

a tappet with a first thrust face and a second thrust face that partially define a tappet pocket, and the tappet defining a lubrication supply passage;

an axle pin affixed to the tappet and including an annular roller bearing surface extending between the first thrust face and the second thrust face, and defining a roller lubrication passage that connects on one end to the lubrication supply passage and opens at an opposite end through the roller bearing surface;

a roller including a roll bearing surface and a cam contact surface extending between a first thrust surface and a second thrust surface, and being mounted in contact for rotation about the axle pin; the first thrust surface including a plurality of non-contiguous first planar surfaces separated by first lubrication grooves;

the second thrust surface including a plurality of non-contiguous second planar surfaces separated by second lubrication grooves;

wherein a portion of lubrication fluid moves from the lubrication supply passage, along the roller bearing surface, into the first and second lubrication grooves, and then between the first thrust face and the first thrust surface and between the second thrust face and the second thrust surface when the roller is rotating; and wherein each of the lubrication grooves has a centerline coincident with a radius from a rotation axis of the roller.

8. The tappet assembly of claim 7 wherein each of the lubrication grooves is partially defined by a ramp that terminates at one of the thrust surfaces.

9. The tappet assembly of claim 7 wherein the roller is symmetrical on each side of a plane perpendicular to a rotation axis of the roller.

10. The tappet assembly of claim 7 wherein the roller is symmetrical on each side of a plane perpendicular to the rotation axis of the roller.

11. The tappet assembly of claim 10 wherein each of the lubrication grooves is partially defined by a ramp that terminates at one of the thrust surfaces.

12. The tappet assembly of claim 11 wherein each side of the roller has six thrust surfaces separated by six lubrication grooves.

13. A method for operating a common rail fuel pump, comprising the steps of:

reciprocating a plurality of tappet assemblies in a pump housing by rotating a cam shaft;

the reciprocating step including rotating a roller on an axle pin of each of the tappet assemblies;

the reciprocating step further including contacting the roller with a cam of the cam shaft;

lubricating a roll interaction between the roller and the axle pin from a lubrication passage that opens through a roller bearing surface of the axle pin;

lubricating a thrust interaction between the roller and thrust faces of a tappet of the tappet assembly by moving lubrication fluid from lubrication grooves separating thrust surfaces of the roller to between the thrust surfaces and thrust faces of the tappet; and wherein the step of lubricating the thrust interaction includes flowing lubrication fluid along the roller bearing surface and into the lubrication grooves, and flowing lubrication fluid along a ramp of each of the lubrication grooves.

14. The method of claim 13 wherein the step of lubricating the thrust interaction includes orienting each of the lubrication grooves to coincide with radius from a rotation axis of the roller.

15. The method of claim 14, further comprising moving the roller along the rotation axis toward contact with a thrust face of the tappet.

* * * * *